United States Patent
Heggelund et al.

(10) Patent No.: US 9,536,333 B2
(45) Date of Patent: Jan. 3, 2017

(54) METHOD AND APPARATUS FOR IMPROVED PROCESSING OF GRAPHICS PRIMITIVES

(71) Applicant: ARM Limited, Cambridge (GB)

(72) Inventors: Frode Heggelund, Trondheim (NO); Andreas Engh-Halstvedt, Trondheim (NO); Jorn Nystad, Trondheim (NO); Henrik Ohlsson, Lund (SE)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 14/056,727

(22) Filed: Oct. 17, 2013

(65) Prior Publication Data

US 2015/0109313 A1   Apr. 23, 2015

(51) Int. Cl.
*G06T 15/40* (2011.01)
*G06T 15/00* (2011.01)
*G06T 11/40* (2006.01)

(52) U.S. Cl.
CPC ............. *G06T 11/40* (2013.01); *G06T 15/005* (2013.01); *G06T 15/40* (2013.01)

(58) Field of Classification Search
None
See application file for complete search history.

(56) References Cited

U.S. PATENT DOCUMENTS

| | | | |
|---|---|---|---|
| 5,798,770 A | 8/1998 | Baldwin | |
| 6,275,235 B1 * | 8/2001 | Morgan, III | 345/582 |
| 7,184,040 B1 | 2/2007 | Tzvetkov | |
| 7,268,779 B2 * | 9/2007 | Piazza et al. | 345/422 |
| 7,733,349 B1 * | 6/2010 | Tannenbaum | G06T 15/506 345/582 |
| 7,804,499 B1 * | 9/2010 | Molnar et al. | 345/423 |
| 8,390,619 B1 | 3/2013 | Voorhies | |
| 2010/0177105 A1 * | 7/2010 | Nystad et al. | 345/522 |

FOREIGN PATENT DOCUMENTS

GB   2517032 A   2/2015
WO   2013085514 A1   6/2013

OTHER PUBLICATIONS

Search Report dated Apr. 8, 2015 in GB Patent Application No. GB1418223.2, 5 pages.

* cited by examiner

*Primary Examiner* — Joni Richer
(74) *Attorney, Agent, or Firm* — Vierra Magen Marcus LLP

(57) ABSTRACT

Operating a graphics processing pipeline that includes processing stages including a rasteriser that rasterises input primitives to generate graphics fragments to be processed, each graphics fragment having one or more sampling points associated with it, and a renderer that processes fragments generated by the rasteriser to generate output fragment data for output to a render output, comprising the following steps: (i) determining first information to test whether at least a part of a primitive should be processed further; (ii) using at least some of the first information to decide whether to process at least a part of the primitive further; and if it is decided that at least a part of the primitive is to be processed further: (iii) determining further information to be used in further processing of the primitive; and (iv) further processing at least a part of the primitive using the determined further information.

23 Claims, 3 Drawing Sheets

METHOD AND APPARATUS FOR IMPROVED PROCESSING OF GRAPHICS PRIMITIVES

BACKGROUND

The technology described herein relates to a method of and apparatus for processing graphics, and in particular to a method and apparatus for use when processing graphics primitives to generate a render output in a graphics processing system.

As is known in the art, graphics processing is normally carried out by first splitting the scene to be displayed into a number of similar basic components or "primitives", which primitives are then subjected to the desired graphics processing operations. The graphics "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processing system, in order, e.g., to render the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed).

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

The rasterisation process basically maps the primitives defining the render output to be generated to the array of sampling points that will be used to render the output. This is typically done by determining, for each sampling point of the render output, whether the sampling point is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point position "passes" the edge test, it is taken to be within the primitive. A positive value for the edge equation is usually taken to indicate that the sampling point is inside the edge in question (that the edge test is "passed"), a negative value for the edge equation is usually taken to indicate that the sampling point is outside the edge in question (that the edge test is "failed"), and a value of "0" may be taken to indicate that the sampling point is inside or outside the edge in question (that the edge test is passed or not), depending on the "tie-break" rule being used.

The rasterisation process is typically carried out by testing sets of one, or of more than one, sampling point. For each set of sampling points found to include a sample point that is covered by the primitive in question (being tested), a discrete graphical entity usually referred to as a "fragment" on which the graphics processing operations (such as rendering) are to be carried out is then generated by the rasteriser and sent to the rest of the graphics processing pipeline (such as the renderer) for processing.

Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per primitive and other state data that is required to shade the primitive at the sample point (fragment position) in question. Each graphics fragment may typically be the same size and location as a "pixel" of the render output (e.g. output frame) (since as the pixels are the singularities in the final display, there may be a one to one mapping between the "fragments" the graphics processor operates on (renders) and the pixels of a display). However, it can be the case that there is not a one to one correspondence between a fragment and a display pixel, for example where particular forms of post processing, such as down-sampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one to one correspondence between the sampling points and the pixels of a display, but more typically there may not be a one to one correspondence between sampling points and display pixels, as down-sampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

Many graphics processing systems use so-called "tile-based" rendering. In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one after another). The rendered tiles are then combined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given render output to be reduced.

In order for a primitive to be rasterised and rendered, various information is provided and determined. As described above, each primitive is initially defined by and represented as a set of vertices. Each vertex for a primitive has associated with it a set of data (such as position, colour, texture and other attributes data) representing the vertex. In order for the rasterisation and rendering processes to be performed, various further data/information is determined from this initial set of data. This further data includes: edge equations, depth equations and barycentric interpolation equations. The edge equations define each edge of the primitive and are determined from its vertices. The depth equations are equations defining the relative depth of the primitive. The barycentric interpolation equations are the equations used for barycentric interpolation with barycentric coordinates at the rendering stage.

Usually, all of this information (edge equations, depth equations and barycentric interpolation equations) is determined at an initial primitive set-up stage which is performed before both rasterisation and rendering.

The Applicants believe that there remains scope for providing improved methods and apparatus for processing primitives when generating a render output in a graphics processing system.

BRIEF DESCRIPTION OF THE DRAWINGS

A number of embodiments of the technology described herein will now be described by way of example only and with reference to the accompanying drawings, in which.

Figure 1:
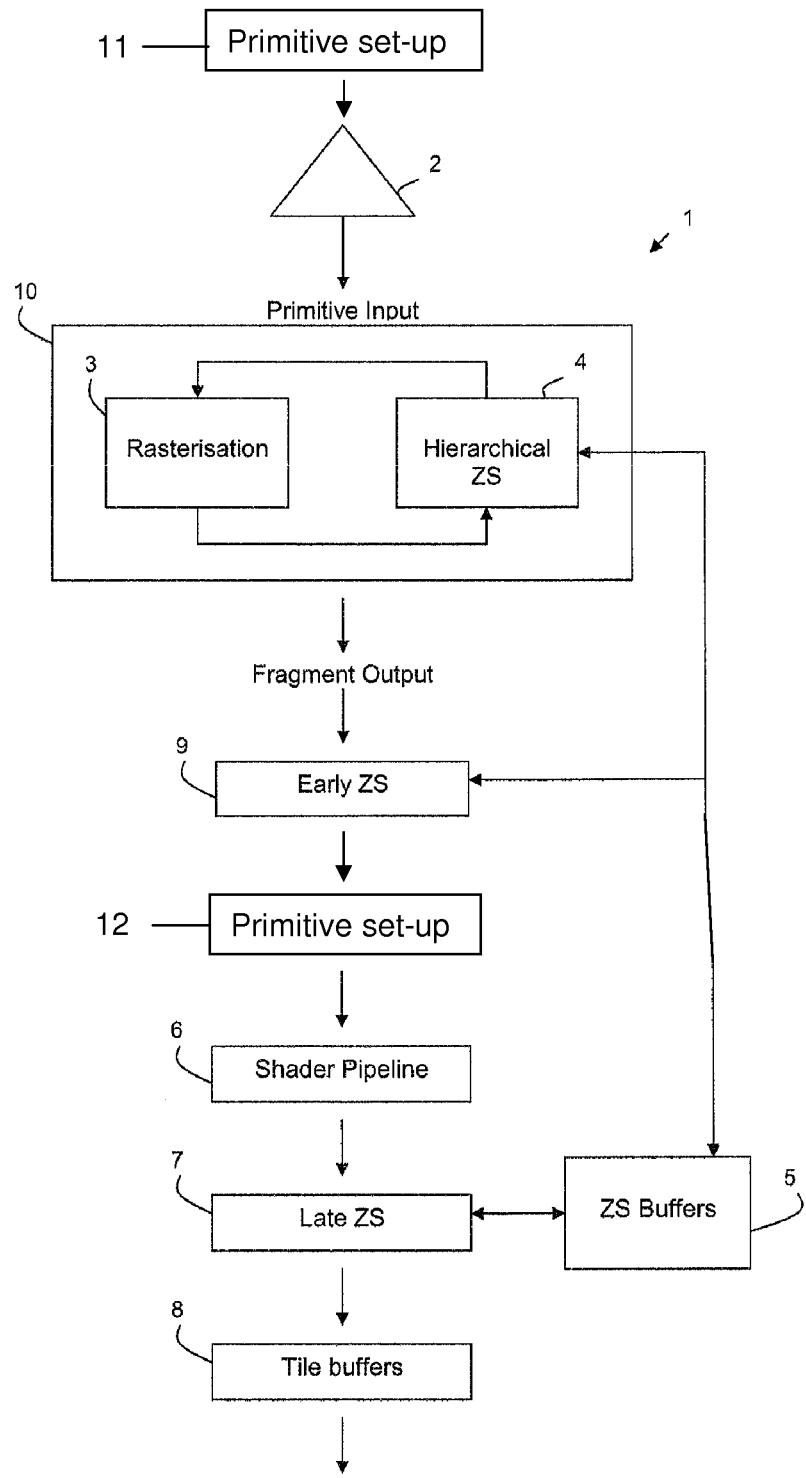
FIG. 1 shows schematically an embodiment of a graphics processing system that can operate in accordance with the technology described herein.

A number of embodiments of the technology described herein will now be described.

DETAILED DESCRIPTION

A first embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data for output to a render output, the method comprising:

when processing a graphics primitive to generate a render output:

(i) determining first information to be used to test whether at least a part of the primitive should be processed further;

(ii) using at least some of the first information to decide whether to process at least a part of the primitive further; and if it is decided that at least a part of the primitive is to be processed further:

(iii) determining further information to be used in further processing of at least a part of the primitive; and (iv) further processing at least a part of the primitive using the determined further information.

A second embodiment of the technology described herein comprises a graphics processing pipeline for rendering input primitives to generate a render output, the pipeline comprising:

a plurality of processing stages including a rasteriser that rasterises input primitives to generate graphics fragments to be processed, each graphics fragment having one or more sampling points associated with it, and a renderer that processes fragments generated by the rasteriser to generate output fragment data for output to a render output;

a first primitive set-up stage configured to determine first information to be used to test whether at least a part of a primitive being processed by the pipeline should be processed further; and a primitive test stage configured to use at least some of the determined first information to decide whether to process at least a part of the primitive further;

wherein the pipeline is configured such that:

if it is decided that the primitive is to be processed further after the primitive test stage:

the primitive then passes to a second primitive set-up stage configured to determine further information to be used in further processing of the primitive; and at least a part of the primitive is then processed further using the determined further information.

In the technology described herein, when a primitive is being processed, first information (such as, as will be discussed further below, an edge equation or equations) is first determined and then tested to decide whether at least a part of the primitive should be processed further, and then, if it is decided that at least a part of the primitive is to be processed further, further information (such as, as will be discussed further below, barycentric interpolation equations) is determined and at least a part of the primitive is processed further using the determined further information.

In other words, in the technology described herein, the primitive set-up is split into two (or more) stages, a first stage, which may be performed before rasterisation, for example, and a second stage, which may be performed after rasterisation but before rendering, for example, and which is performed only if the primitive passes a test to decide whether to process at least a part of the primitive further.

This then facilitates, for example, ensuring that a part of the primitive set-up which is not required until the rendering stage, for example, will only be performed if a primitive (or at least a part thereof) first passes a test to decide whether to process at least a part of the primitive further (e.g. the rasterisation stage) (and correspondingly facilitates, for example, ensuring that a part of the primitive set-up which is not required until the rendering stage, for example, will only be performed if a primitive (or at least a part thereof) first passes a test to decide whether to process at least a part of the primitive further).

This may then avoid determining for a primitive, primitive set-up information that will never actually be required (because the primitive will fail a test to decide whether to process at least a part of the primitive further), thereby avoiding unnecessary processing operations and so saving power, memory bandwidth, memory, etc.

The first information that is determined can comprise any suitable information that can be used to test whether at least a part of the primitive should be processed further. In an embodiment, it comprises some, but not all, of the primitive set-up information that is required for processing the primitive.

In one embodiment, the first information comprises information to be used to determine if the primitive is located at least partially within a given (area) region (in an x-y plane) of the render output. In this case, the first information, in an embodiment, comprises information specifying the location of at least one edge of the primitive, such as an edge equation, for example. Only one edge equation could be determined for the first information, but in some embodiments, the first information comprises information specifying the location of two or more of, or all of, the edges of the primitive.

In this case, in an embodiment, the testing step (ii) (the primitive test stage) then comprises using the first information, e.g. edge equation(s), to test if the primitive is, according to the (tested) first information, located at least partially within a given (particular, in an embodiment selected) region (area) of the render output (and if it is determined from the test that the primitive is located at least partially within the region of the render output, then determining further information for processing the primitive).

In this case, the region of the render output that is being considered (that the primitive is being tested against) could be a tile (e.g. in a tile-based graphics processing system), a patch comprising a plurality of sampling positions, or a single sampling position, for example. The sampling position or positions could be those used by the rasteriser or during rasterisation, for example.

In an embodiment, where the graphics processing system is a tile-based graphics processing system, the first information comprises information, such as, and in an embodiment, an edge equation or equations, representing an edge or edges of the primitive, and that first information is then used (in the primitive test stage) to determine whether the primitive lies outside the tile being processed or not (and if it is determined from this test that the primitive does not lie outside the tile being processed, it is decided that at least part of the primitive is to be processed further). This may be particularly appropriate where the graphics processing system is a graphics processing system in which tile lists (primitive lists) can be prepared for sets of plural tiles.

In some embodiments, information specifying each edge of the primitive is determined and then tested on an edge-by-edge basis. Thus, further edges (edge equations) may only be determined (and tested) if the primitive (or at least a part thereof) was not found to lie outside the region in question when testing the previously determined edge(s).

In alternative embodiments, information specifying all of the edges of the primitive is determined before each edge is then tested (e.g. one by one). Thus, edge testing is only performed once information specifying all of the edges of the primitive has been determined.

In these embodiments, the testing step (ii) (the primitive test stage) may be implemented as desired. In one embodiment the testing step (ii) (the primitive test stage) is implemented before the rasteriser. This may be appropriate, for example, where the test is to determine if a primitive lies outside a tile being processed or not.

In another embodiment it is implemented as part of the rasteriser (as part of the rasterisation process). Thus, in one embodiment the rasteriser includes the primitive test stage and performs the testing step (ii). In this case, the testing step in an embodiment comprises and is implemented as a first stage of the rasterisation process (e.g. where, as will be discussed further below, the rasterisation process iteratively tests progressively smaller patches of the render output against a primitive).

In another embodiment, the first information comprises information to be used in an (early) culling test that is to be used to test whether the primitive or at least a part of the primitive should continue to be processed. This may be in addition to or instead of the information to be used to determine if the primitive is located at least partially within a given region (area) of the render output, In this case, the early culling test may comprise any suitable such testing, such as early occlusion testing, such as depth (Z) testing and/or early stencil testing. In an embodiment it comprises an early (Z) test (or tests). In an embodiment it comprises both early depth and early stencil tests.

Thus, in an embodiment the first information, alternatively or additionally, comprises information to be used in a depth test (e.g. to determine whether all or at least a part of the primitive would be visible in the render output). For example, the first information may comprise a depth equation or equations for the primitive, and/or minimum and maximum depth values for the primitive, etc.

In this case, step (ii) (the primitive test stage), in an embodiment, comprises performing a depth test for the primitive.

The depth test could comprise a "normal" depth test (e.g. using depth values derived from a depth equation for the primitive), but it could also, e.g., comprise a lower precision depth test (e.g. based on only minimum and maximum depth values for the primitive) (with the depth equation for the primitive then only being derived (and a "full" depth test performed) if (at least a part of) the primitive passes the lower precision depth test).

The determining and testing of depth information could be performed alternatively or in addition to the determining and testing of information specifying the location of the primitive. If both depth information and information specifying the location of the primitive are determined and tested, these steps could be performed in parallel or in series. For example, both kinds of information could first be determined before either is tested (and, e.g., if the primitive fails a first test, it would not be necessary to perform the second test). Alternatively, one kind of information could be determined and tested and the second kind only determined and tested if the primitive passed the test of the first kind.

Similarly, in an embodiment, the first information alternatively or additionally comprises information to be used in a stencil test. For example, the first information may comprise information required to subject the primitive to a stencil test, such as a stencil reference value for the primitive. In this case, step (ii) (the primitive test stage), in an embodiment, comprises performing a stencil test for the primitive.

Again, the determining and testing of stencil information could be performed alternatively or in addition to the determining and testing of information specifying the location of the primitive and/or of information to be used in a depth test. If stencil information as well as information specifying the location of the primitive and/or depth test information are determined and tested, these steps could be performed in parallel or in series. For example, all kinds of information could first be determined before any is tested (and, e.g., if the primitive fails a first test, it would not be necessary to perform the second and any subsequent tests). Alternatively, one kind of information could be determined and tested and the second kind only determined and tested if the primitive passed the test of the first kind.

In these arrangements, the early culling test or tests may be implemented, e.g., as part of the rasteriser, or after the rasteriser (but before the renderer), or as a combination of this (e.g. where there is more than one early culling test). In an embodiment it or they are implemented as part of the rasterisation process (within the rasteriser), and/or after the rasteriser but before the rest of the graphics processing pipeline.

If the primitive passes the first test such that it is decided that a least part of the primitive should be processed further, then, as discussed above, further information to be used in further processing of at least a part of the primitive is determined.

This further information can be any suitable information that will be needed for processing at least a part of the primitive, but in an embodiment comprises primitive set-up information, and, in an embodiment, primitive set-up information that was not in the first information that was determined.

In one embodiment, the further information that is determined at step (iii) (at the second primitive set-up stage) comprises information to be used to test whether at least a part of the primitive should be processed further.

In this case, the further information may again comprise: information to be used to determine if the primitive is located at least partially within a region of the render output; and/or information to be used in a depth and/or stencil test. As above, the information to be used to determine if the primitive is located at least partially within a region of the render output, in an embodiment, comprises information specifying the location of one or two or more or all of the edges of the primitive.

In these arrangements, the determination of the further information can be, as discussed above, e.g., implemented before the rasteriser, or as part of the rasteriser, and/or after the rasteriser (but before the renderer), e.g. depending upon the nature of the further information and then the further processing (the test) that is to be performed using that further information.

Step (iii) (the second primitive set-up stage) may also or instead include determining information to be used for rendering (shading) the primitive. Thus, the determination of information that is not required until rendering (shading) the primitive may be delayed until later in the process, such that it is only determined if the primitive has passed at least one earlier test (e.g. an edge, depth and/or stencil test or tests).

The information to be used for rendering the primitive may comprise one or more barycentric equations for the primitive, for example. The barycentric equations are not required for rasterisation, only for rendering. Thus, by delaying the determination of the barycentric equations until the primitive has passed at least one earlier test (e.g. an edge, depth or stencil test (and, in an embodiment, until after rasterisation)), the barycentric equations need only be determined for primitives which, e.g., have passed the rasterisation stage (and any early culling tests).

In this case, the step of determining the further information for processing the primitive (the second primitive set-up stage) may be implemented as desired, but is, in an embodiment, implemented after the rasterisation process, and, in an embodiment, also after any early culling tests that may be performed on a primitive or fragments generated for a primitive. Thus it is, in an embodiment, implemented after the rasteriser (but before the renderer (shader)). In this case the further information could, for example, be derived prior to the renderer (the shader), or it could be derived as part of the rendering (shading) process (by the renderer (shader)) when it is required).

In an embodiment, in these arrangements the further information (e.g. the rendering information, such as barycentric equations) is only determined if the primitive results in fragments for rendering being issued from the rasteriser (from the rasterisation process) and at least one of those fragments passes all the early culling tests that the primitive is subjected to. For example, the further information in this case could be, and, in an embodiment, is, only determined if and when a first fragment for the primitive executes a varying instruction in the renderer (shader).

The further processing that is performed for at least a part of the primitive using the determined further information can be any suitable such processing, and will depend, for example, upon the nature of the determined further information.

Thus, for example, where the determined further information is information that is to be used to test whether at least a part of the primitive should be processed further, the further processing of at least part of the primitive using the determined further information should and, in an embodiment, does comprise performing the relevant test using the determined further information (i.e. using at least some of the determined further information to decide whether to process at least a part of the primitive further). This could comprise, for example, carrying out further edge, depth and/or stencil tests for all or part of the primitive.

In this case, if it is then decided following the test that at least a part of the primitive is to be processed further, yet further information to be used for further processing of at least a part of the primitive is determined, and the at least a part of the primitive is then further processed using the determined further information, and so on. Thus, for example, where the first information is an edge equation for the primitive and if when that edge equation is tested it is decided that at least a part of the primitive is to be processed further, then the determined further information could be a further edge equation for the primitive, which could then be tested, and if that edge test is passed, another (e.g. the final) edge equation for primitive could be determined and tested, and so on.

In these arrangements, the processing (testing) of the further information can be, as discussed above, e.g., implemented before the rasteriser, or as part of the rasteriser, and/or after the rasteriser (but before the renderer), e.g. depending upon the nature of the further information and then the further processing (the test) that is to be performed using that further information.

Alternatively or additionally, where the determined further information to be used in further processing of at least a part of the primitive comprises information to be used for rendering (shading) the primitive, such as a barycentric equation(s) for the primitive, then the further processing of at least a part of the primitive using the determined further information should and, in an embodiment, does comprise rendering (shading) the primitive using the determined rendering information (e.g. barycentric equation(s)).

Thus, in an embodiment, the further processing of at least a part of the primitive using the determined further information if the primitive (or at least a part thereof) passes step (ii) (the primitive test stage) that is performed after step (iii) (the second primitive set-up stage) comprises rendering (shading) some or all of (at least a part of) the primitive. Correspondingly, in an embodiment, the renderer (the shader) performs the further processing of at least a part of the primitive using the determined further information.

It will be appreciated from the above that in embodiments the technology described herein may comprise repeatedly determining further information to be used in further processing of at least a part of the primitive, further processing at least a part of the primitive using the determined further information, and then repeating these steps as additional information (e.g. primitive set-up information) to be used in further processing of at least a part of the primitive is determined and the primitive passes any tests performed using that information.

It will also be appreciated from the above that in embodiments of the technology described herein, the first information that is determined will comprise some but not all of the primitive set-up information that is needed for processing the primitive (such as, and in an embodiment, at least an edge equation or equations for the primitive and potentially a depth equation for the primitive), and the further information that is determined will then comprise further primitive set-up information that was not determined as part of the first information, such as, and in an embodiment, a barycentric equation or equations for the primitive.

Correspondingly, at least some primitive set-up information, such as, and in an embodiment, a barycentric equation or equations for the primitive, is only determined for the primitive if (at least a part of) the primitive passes one or more tests to determine if (at least a part of) the primitive should be processed further (and in an embodiment only if the primitive results in fragments for rendering being issued from the rasteriser (from the rasterisation process) to the renderer (the shader) for processing).

In an embodiment, the steps of determining barycentric equations for the primitive and then rendering (shading) the primitive using those equations are performed once (and only once) a first fragment for the primitive executes a varying instruction.

Indeed, the Applicants believe that the idea of deferring the calculation of information, such as barycentric equations, to be used when rendering a primitive until the rendering (shading) stage of a graphics processing pipeline may be new and advantageous in its own right, and not just in conjunction with the other features of the technology described herein described above. For example, this could also allow the calculation of the barycentric equations to be avoided in the case where a shader discard leads to all fragments for a primitive being culled (killed) before the barycentric equations are required.

Thus, another embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data for output to a render output, and in which the renderer, when generating output fragment data for fragments of a primitive for output to the render output, uses primitive rendering set-up information that is determined for the primitive, the method comprising:

when processing a graphics primitive to generate a render output:
only determining some or all of the primitive rendering set-up information that the renderer requires to process fragments of the primitive to generate output fragment data for the primitive when a fragment for the primitive reaches the renderer.

Another embodiment of the technology described herein comprises a graphics processing pipeline for rendering input primitives to generate a render output, the pipeline comprising:
a plurality of processing stages including a rasteriser that rasterises input primitives to generate graphics fragments to be processed, each graphics fragment having one or more sampling points associated with it, and a renderer that processes fragments generated by the rasteriser to generate output fragment data for output to a render output, which renderer, when generating output fragment data for fragments of a primitive for output to the render output, uses primitive rendering set-up information that is determined for the primitive;
wherein the pipeline is configured to, when processing a graphics primitive to generate a render output:
only determine some or all of the primitive rendering set-up information for a primitive that the renderer requires to process fragments of a primitive to generate output fragment data for the primitive when a fragment for the primitive reaches the renderer.

As will be appreciated by those skilled in the art, these embodiments of the technology described herein can, and in an embodiment do, include any one or more or all of the optional features of the technology described herein described herein, as appropriate.

Thus, for example, the primitive rendering set-up information for a primitive required by the renderer in an embodiment comprises one or more barycentric equations for the primitive.

Similarly, the primitive set-up rendering information that is required by the renderer for processing the fragments for the primitive is, in an embodiment, only determined once a first fragment for the primitive executes or undergoes a process or an instruction, such as a varying instruction, in the renderer that requires the use of the primitive rendering information (e.g. barycentric equations).

Also, the renderer is, in an embodiment, in the form of a programmable fragment shader, and/or the renderer (fragment shader), in an embodiment, determines the primitive rendering set-up information.

In these arrangements, the primitive rendering set-up information, such as the barycentric equations, is only calculated once a fragment for a primitive reaches the renderer (fragment shader). Thus the calculation of the rendering information, e.g. barycentric equation or equations, for a primitive is deferred until a fragment for the primitive reaches the renderer (and, in an embodiment, until a first fragment for the primitive executes a varying instruction in the renderer).

It would also be possible for some processing of the primitive to be done between steps (ii) and (iii) (between the primitive test stage and the second primitive set-up stage) (if it is decided that at least part of the primitive is to be processed further), for example depending on the processing (testing) that the primitive has already undergone. For example, and in an embodiment, the primitive (or at least a part thereof) could be "fully" rasterised after the primitive test stage (after step (ii)) before the further primitive information is determined.

As discussed above, if when the primitive is tested using the first (or further) information, and it is decided from the test that at least a part of the primitive should be processed further, then further information for processing the primitive is determined and (at least a part of) the primitive is processed further.

On the other hand, if when the primitive is tested using the first (or further) information, it is decided from the test that at least a part of the primitive should not be processed further, then (the at least a part of) the primitive is, in an embodiment, not processed further.

Thus, in an embodiment, if after step (ii) or the primitive test stage, it is decided that a primitive (or at least a part thereof) is not to be processed further, that primitive (or at least the relevant part thereof) is culled from further processing (is not processed further).

This will then "cull" a primitive (or at least a part thereof) from further processing before the primitive has been fully "set-up" because the first information to be used to test the primitive is tested before further information to be used in further processing of the primitive (e.g. further testing or rendering) is determined.

Thus, if it is determined from the first (or further) information that the primitive is not located at least partially within the particular region of the render output in question, the primitive (or a part thereof) is, in an embodiment, culled from further processing. Thus, in an embodiment, if the primitive fails an edge test, it is culled from further processing, i.e. there is no need to test information specifying further edge(s) once a primitive has been found to lie outside the region in question when testing a previous edge.

Similarly, if it is determined using the first (or further) information that the primitive or a part thereof does not pass a depth test, the primitive (or the part thereof) is, in an embodiment, culled from further processing, and/or if it is determined that the primitive or a part thereof does not pass a stencil test, the primitive (or the part thereof) is, in an embodiment, culled from further processing.

It will be appreciated in this regard that depending upon the nature of the test for the primitive, either all or only part of the primitive may be culled. For example, where the test is to determine if a primitive lies outside a tile being processed, then the primitive as a whole may be culled from processing for the tile if it is determined to lie entirely outside the tile. On the other hand, if it is determined, for example, that only part but not all of the primitive fails a depth test (for example where the depth test tests only parts of the primitive at a time), then only the relevant part of the primitive may be (and should be) culled.

Correspondingly, the first and further information that it is determined for processing the primitive may relate to and be determined for the primitive as a whole, and/or may relate only to a part or parts of the primitive, depending upon the nature of the information and the purpose that it is to be used for. In an embodiment, for example where the first and further information comprises edge equations, depth equations and/or barycentric equations, then the information is determined for the primitive as a whole (and retained for the primitive unless and until it has been determined that no part of the primitive falls to be processed (until all of the primitive (all parts of primitives) have been culled)). Other arrangements would, of course, be possible.

It will be appreciated from the above that in one embodiment, the technology described herein will comprise determining all of the edge equations and a depth equation and/or one or more stencil reference values for the primitive, rasterising the primitive, and then, and only if rasterisation results in fragments being produced for the primitive (and at least one of the fragments passes any depth or stencil tests), calculating barycentric equations for the primitive, and then rendering the fragments for the primitive.

Correspondingly, in an alternative embodiment, in a tile-based graphics processing system, the technology described herein will comprise, when processing a primitive for a tile: determining all of the edge equations for the primitive, determining whether the primitive is located at least partially within the tile being processed, culling the primitive from further processing for the tile if it is determined that the primitive is not located at least partially within the tile being processed, and, if not, determining a depth equation and/or information required to subject the primitive to a stencil test, such as a stencil reference value for the primitive, rasterising the primitive, performing an early depth and/or stencil test based on the determined depth equation and/or one or more stencil reference values, and calculating the barycentric equation(s) for the primitive only if rasterisation results in fragments being produced for the primitive and at least one of the fragments passes any early depth and/or stencil tests.

In another embodiment, in a tile-based graphics processing system, the technology described herein will comprise, when processing a primitive for a tile: determining first information specifying the location of a first edge of a primitive, testing based on the first information whether the primitive is located inside the tile being processed for the tile, and, if it is determined that the primitive is not located inside the tile, culling the primitive from further processing for the tile, and if not, determining second information specifying the location of a second edge of the primitive, testing based on the second information whether the primitive is located inside the tile, and, if it is determined that the primitive is not located inside the tile, culling the primitive from further processing for the tile, and, if not, determining third information specifying the location of a third edge of the primitive, testing based on the third information whether the primitive is located inside the tile, and, if it is determined that the primitive is not located inside the tile, culling the primitive from further processing for the tile, and, if not, determining a depth equation and/or one or more stencil reference values for the primitive, rasterising the primitive, performing a depth and/or stencil test using the determined equation(s) and/or one or more stencil reference values, and then determining barycentric equations for the primitive and then rendering the primitive (only) if rasterisation results in fragments being produced for the primitive and at least one of the fragments passes the depth and/or stencil tests.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner, for example as in known rasterising arrangements. It will, as is known in the art, receive e.g. primitives to be rasterised, test those primitives against sets of sampling point positions, and generate fragments representing the primitives accordingly.

The rasteriser should, as is known in the art, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser, in an embodiment, generates a graphics fragment for each sampling point covered by, and/or for each set of plural sampling points (e.g., sampling mask) found to include a sampling point that is covered by, the (and each) primitive being rasterised.

Each fragment generated by the rasteriser may represent (have associated with it) a single sampling point, or plural sampling points, as desired. In an embodiment, each fragment represents a set of plural, in an embodiment four (2×2), sampling points.

In an embodiment, the rasteriser is a hierarchical rasteriser that operates to iteratively test primitives against progressively smaller patches of sampling points down to a given, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested, in an embodiment, corresponds to an integer number of fragments, such as 16×16, 8×8, 4×4 and/or 2×2 fragments.

In an embodiment, the rasteriser starts with a large patch of the render target area and tests if the primitive in question is inside that patch. If not, the entire patch is discarded, and the next patch tested, and so on. On the other hand, if a primitive is found to be within the patch (to cover, at least in part, the patch), the patch is sub-divided, in an embodiment into 4 parts, and each "sub-patch" then tested in the same way, and so on, until a minimum patch size is reached (which in an embodiment corresponds to a 2×2 group of fragments) (but which could, e.g., be an individual sampling point, an individual fragment, or a different sized group of fragments).

Where in this arrangement the smallest patch size contains plural sampling points, the rasteriser in an embodiment then tests the individual sampling points in the final patch to see if they are covered by the primitive, and then generates fragments accordingly.

As will be appreciated from the above, in an embodiment the graphics processing pipeline includes one or more (early) culling tests, in an embodiment an early depth (Z) test (or tests), and in an embodiment both an early depth and an early stencil test.

The early culling test stage(s) could operate on patches (sets) of plural fragments (for example, where the rasteriser can rasterise primitives into patches of plural fragments, such patches could then be subject as a whole to an early culling test), or could also or instead, and in an embodiment also, operate on single fragments, or could also or instead, and in an embodiment also, operate on (test), single sampling points.

In an embodiment, an early culling test is performed in respect of one or more of: a single sampling point associated with a fragment generated by the rasteriser; a single fragment generated by the rasteriser (and thus for all of (the set of) sampling points associated with the fragment); and a set of plural fragments generated by the rasteriser (and thus for all (the sets of) sampling points associated with the plural fragments).

The early culling test or tests themselves can be carried out in any suitable and desired manner, e.g., in the normal manner known in the art and/or used in the graphics processing system in question. They are in an embodiment carried out in an appropriately conservative manner, as is known in the art. They may, e.g., test the (or each) sampling point specifically, or may be tests that have the effect of testing the sampling point(s), even if they do not test the (or each) sampling point specifically.

The early culling test or tests may be implemented, e.g., as part of the rasteriser, or after the rasteriser (but before the renderer), or as a combination of this (e.g. where there is more than one early culling test). In an embodiment it or they are implemented as part of the rasterisation process and/or after the rasteriser but before the rest of the graphics processing pipeline.

If the sampling point or points, or fragment or fragments, etc., being tested fails the early culling test (e.g. is found to be occluded), then that sampling point or points, or fragment or fragments, etc., is, as discussed above, in an embodiment "culled" from further processing in the pipeline, as is known in the art. This culling can be achieved (and provided) in any desired and suitable manner.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

Although the technology described herein has been described above with particular reference to the processing of a given primitive, as will be appreciated by those skilled in the art, these processes should be performed for each primitive in the render output (e.g. frame to be displayed).

The graphics processing pipeline may also contain any other suitable and desired processing stages that a graphics processing pipeline may contain such as a late depth (or depth and stencil) tester, a blender, etc.

The render output to be generated may comprise any render output that is to be generated by the graphics processing pipeline. Thus it may comprise, for example, a tile to be generated in a tile based graphics processing system, and/or a frame of output fragment data. The technology described herein can be used for all forms of output that a graphics processing pipeline may be used to generate, such as frames for display, render-to-texture outputs, etc. In an embodiment, the render output is an output frame.

The technology described herein may be carried out by any kind of graphics processing system. However, in an embodiment, the graphics processing system is a tile-based (tiling) graphics processing system. In this case, the pipeline in an embodiment also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to the frame buffer for the display device.

In some embodiments, the pipeline comprises, and/or is in communication with, one or more buffers and/or memory devices that store the data described herein, and/or store software for performing the processes described herein. The pipeline may also be in communication with a host microprocessor, and/or with a display for displaying images based on the data generated by the data processing system.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processing circuitry, a computer program element comprising computer software code portions for performing the methods herein described when the program element is run on data processing circuitry, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processing circuitry causes in conjunction with said data processing circuitry said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows schematically a graphics processor 1 in the form of a graphics processing pipeline that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage 11 has, in accordance with the technology described herein, partly, but not completely, set-up the primitives to be rendered in response to the commands and vertex data provided to the graphics processor 1 (this will be discussed further below).

As shown in FIG. 1, this part of the fragment processing pipeline of the graphics processor 1 includes a number of processing stages, including a rasteriser 10 that includes a rasterisation stage 3 and an early hierarchical ZS (depth and stencil) test stage 4, an early ZS (depth and stencil) test stage 9, a rendering stage in the form of a fragment shading stage 6, and a late ZS (depth and stencil) test stage 7. The pipeline also includes and/or has access to (is in communication with) appropriate memory for storing the data that the pipeline will use and/or generate, such as a depth and stencil buffer(s) 5, tile buffers 8, etc.

The rasteriser 10 operates, as is known in the art, to rasterise the primitives making up the render output (e.g. the image to be displayed) into individual graphics fragments for processing. To do this, the rasteriser 10 receives graphics primitives 2 to be rendered, rasterises the primitives to sampling points and generates graphics fragments having appropriate positions (representing appropriate sampling positions) for rendering the primitives. In the present embodiment, each graphics fragment that is generated by the rasteriser 10 represents (has associated with it) plural (and normally four) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 10 is a hierarchical rasteriser that operates to iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation stage 3 of the rasteriser 10 performs this render output patch testing. To do this, it starts with a large patch of the render output (the render target) area and tests the patch against the edges of the primitive in question to determine if the primitive at least partially covers any patch of a 2×2 set of smaller patches of the render output (the render target area) that the large patch is divided into (encompasses).

The edges of the primitive are represented by appropriate line (edge) equations that have been derived from the vertices of the primitive, as is known in the art, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 3 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

Other arrangements would, of course, be possible.

If it is found that the large patch is not covered by the primitive at all, then the patch is not processed further in respect of the primitive in question (i.e. the entire patch is discarded for the primitive in question), and another (the next) large patch is tested against the primitive, and so on.

On the other hand, if a primitive is found to at least partially cover any of the smaller patches of the set of plural smaller patches of the render output that the large patch encompasses (is divided into) (i.e. the primitive is found to cover, at least in part, the large patch), the large patch is subdivided into its four smaller patches, and each covered such smaller patch ("sub-patch") is then tested against the primitive and processed in the same way (i.e. discarded, or sub-divided into a set of smaller patches, depending upon whether it is covered by the primitive or not).

This patch testing and discarding or subdivision is continued until the minimum patch size is reached.

The present embodiment supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 2:
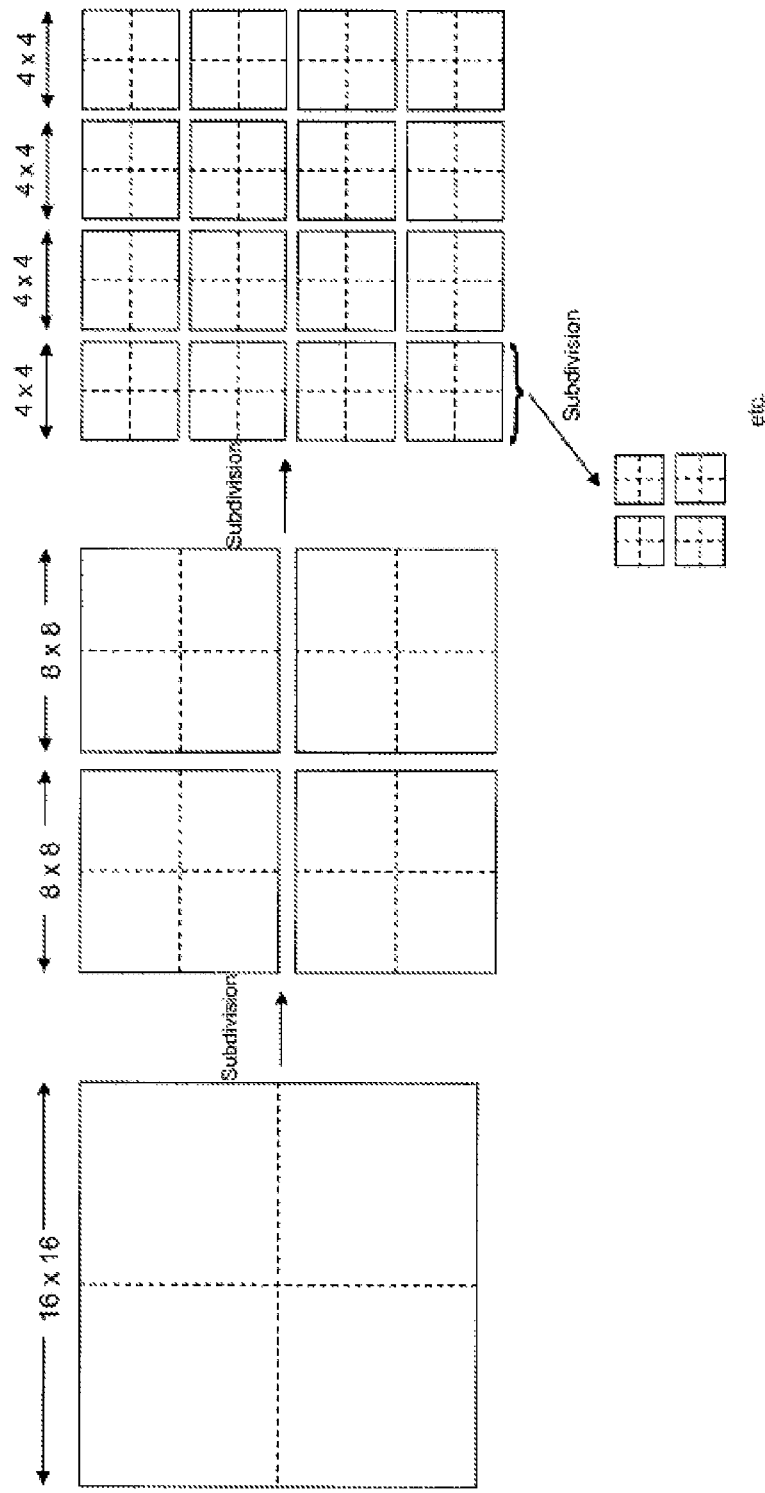
FIG. 2 illustrates the sub-division process that is used by the rasteriser in the described embodiment of the technology described herein.

FIG. 2 illustrates the subdivision process and shows a top level, 16×16 fragment, patch being progressively subdivided down to the minimum patch size of 2×2 fragments.

Once the minimum patch size has been reached (i.e. a patch of 2×2 fragments that covers, at least in part, the primitive has been identified), the rasterisation stage 3 then tests the individual sampling points in that final patch to see if the sampling points are covered by the primitive. The rasteriser 10 then generates and outputs individual fragments for rendering corresponding to the sampling points found to be covered by the primitive (so four fragments if all the 2×2 fragments in the minimum size patch are at least partially covered by the primitive).

The rasteriser 10 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, the rasterisation process takes each largest-size patch to be tested against a primitive in turn, and sub-divides that patch and then tests the relevant smaller patches (sub-patches) within that largest-size patch, and so on, until all sub-division and testing for that largest-size patch has been completed.

Once this is done, the rasterisation process then moves on to the next first level, largest size patch, and tests that patch, and so on, until all the first level, largest size patches that the primitive is to be tested against have been tested.

Other arrangements would, of course, be possible.

In the present embodiment, each primitive to be rasterised is tested against each first level (larger size) patch of the render output that falls within (is covered by) a bounding box generated for the primitive. Other arrangements would, of course, be possible.

Once all the highest level, largest size patches of the render output have been tested against a primitive (and subdivided or discarded, as appropriate), then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

The rasteriser 10 is configured in the present embodiment as a pipeline that can contain and process plural patches at the same time. The rasteriser 10 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

As shown in FIG. 1, the rasteriser 3 also has an early "hierarchical" depth (Z) and stencil testing stage 4 associated with it. This hierarchical depth and stencil testing stage 4 performs "early" depth and stencil tests on the patches generated by the rasterisation stage 3 to see if those patches can be culled.

To do this, each patch of the render output generated by the rasterisation stage 3 is sent to the early hierarchical depth and stencil test stage 4, which then performs a Z (depth) test on the patch of the render output to see if the patch can be discarded (culled) at this stage. At the same time, an early stencil test is carried out.

If the patch being tested fails the early depth and stencil test, it is discarded (culled) from any further processing.

If the patch being tested passes the early depth and stencil test, it is returned to the rasterisation stage 3 for further subdivision into smaller patches ("sub-patches") as discussed above. Each (covered) "sub-patch" is then returned to the early depth and stencil tester 4 for testing, and so on, until the minimum patch size is reached.

In the present embodiment the early hierarchical depth tester 4 uses a depth value range for each patch it receives from the rasterisation stage 3 by taking appropriate depth samples across the patch, and compares that depth value range with a previously derived and stored depth value range associated with the sampling (fragment) positions that the patch covers, to try to determine whether the patch will be occluded by or overdraw other fragments and sampling points to be rendered (e.g. that are further on in the pipeline or that have already been rendered) or not.

The depth value ranges that are used by the early hierarchical depth and stencil testing stage 4 when performing depth and stencil tests on patches of the render output that it receives from the rasterisation stage 3 are stored in the depth and stencil buffers 5. A range of depth values (and a stencil value) is stored in the depth and stencil buffer 5 for each patch size and position that the buffer represents (essentially for each patch size and position that the rasterisation stage 3 could generate for the tile that is being processed).

The depth value range that is stored for each patch is initially set to a default value, or to an expected depth value range for the patch if that can be determined. (In some arrangements, the possible depth values that primitives for a tile may have may be known in advance. This can then be used to populate the depth buffer 5 with ranges of expected depth values for the patches in question.) The stored patch depth value ranges are then updated as patches and/or sampling points being tested by the early hierarchical depth and stencil testing stage 4, the early depth and stencil testing stage 9, and the late depth and stencil testing stage 7, pass the respective depth and stencil tests.

Other forms of depth and/or stencil testing and depth and stencil value representations could be used, if desired.

The early hierarchical depth and stencil test stage 4 is configured to operate in an appropriately conservative manner, as is known in the art.

Once the minimum patch size is reached (a patch of 2×2 fragments in this embodiment), the rasteriser 10 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 10 to an early depth and stencil test in the early depth and stencil test stage 9. This early depth and stencil test stage 9 performs depth and stencil tests on the individual (covered) sampling positions associated with the fragments issued by the rasteriser 10 (i.e. at a per-sampling point resolution).

To do this, the early depth and stencil tester 9 uses per-sampling position depth and stencil values stored in the depth and stencil buffers 5. Thus, the depth and stencil buffers 5 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 9 and the late depth and stencil testing stage 7 pass the respective depth and stencil tests (the stencil values can be stored/updated when the tests are failed as well).

The depth and stencil buffers 5 are configured as two distinct buffers (although they may in the same physical memory) in this embodiment, one buffer storing per-patch depth ranges, and the other storing per-sample depth values. Other arrangements would, of course, be possible.

The early depth and stencil test stage 9 is again configured to operate in an appropriately conservative manner, as is known in the art.

Fragments that pass the early depth and stencil test stage 9 (i.e. fragments having at least one associated covered sampling position that passes the early depth and stencil test stage 9) are then sent onwards to the fragment shading stage 6 (the renderer), as shown in FIG. 1.

(Fragments that fail the early depth and stencil test stage 9 are culled by the early depth and stencil test stage 9, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 6 should be stored in the tile buffers 8 (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary "late" alpha and/or stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes certain features of the rasterisation and rendering processes of the graphics processing system shown in FIG. 1. Further features of the operation of the graphics processing system shown in FIG. 1 in accordance with an embodiment of the technology described herein will now be described.

As discussed above, before a primitive 2 is passed into the rasteriser 10, it passes through a first primitive set-up stage 11. This first primitive set-up stage 11 is configured to determine information to be used to test whether a primitive (or at least a part thereof) should be processed further.

In the present embodiment, this first primitive set-up stage 11 is configured to determine the edge equations for the primitive and a depth equation and/or one or more stencil reference values for the primitive (before any of these are tested). The rasteriser 10 then uses this information to determine if the primitive should (at least in part) be rendered, by performing one or more edge tests, a depth test and/or a stencil test as discussed above.

Thus, following the first primitive set-up stage 11, the primitive is then rasterised by the rasteriser 10, using the determined primitive set-up information.

If rasterisation results in fragments being produced for the primitive, and at least a part of the primitive passes the early depth and stencil tests, then the fragments for the primitive are passed to a second primitive set-up stage 12 provided after the rasteriser 10 and before the shader pipeline (renderer) 6.

The second primitive set-up stage 12 determines the barycentric equations for the primitive, which are then used by the fragment shader 6 when rendering (shading) the fragments for the primitive. In the present embodiment, the barycentric equations for use when rendering (shading) the primitive are determined once (and only once) a first fragment for the primitive executes a varying instruction.

In this way, the determination of the barycentric equations for a primitive is deferred until it is know that fragments for the primitive will definitely be processed by the fragment shader 6. This then allows the determination of the barycentric equations for a primitive to be avoided if the primitive does not in fact result in fragments to be rendered (shaded).

In the above embodiment, all the edge equations and the depth equation for a primitive are calculated and then the hierarchical rasterisation and sub-division is performed, and then only if the primitive produces fragments for rendering, are the barycentric equations calculated. However, as discussed above, alternative arrangements would be possible, if desired. For example, only the edge equations could be calculated and then used to determine if the primitive is within the tile being processed before rasterisation.

Similarly, the edge equations and edge checking for the first hierarchical sub-division level could be done first, and then the depth equation (and other primitive set-up calculations) only performed if the primitive is still alive. In this case, the hierarchical rasterisation could, e.g., continue by first doing depth and stencil tests for the current sub-division level before any further sub-division.

Equally, all the edge equations could be calculated and then a first rasterisation pass to determine if the primitive is intersecting the tile being processed at all performed, with the depth equation being calculated only if the primitive is not culled by the edge tests.

It would also be possible to do a lower precision depth check using, e.g., only a minimum and maximum depth values for the primitive, to see if the primitive can be culled on the basis of this depth check before calculating the full depth equation.

In this case, if the primitive passes the first pass rasterisation and any lower precision depth check, then the depth equation could be calculated, and the primitive could be fully rasterised and subjected to an early depth test, with the barycentric equations then being calculated only if the primitive rasterises to fragments and at least one of those fragments passes the early depth test.

It would also be possible, e.g., to determine and test the edge equations for the primitive one at a time, if desired. In this case, the first edge equation will be calculated and then used, e.g., to test whether the primitive is inside the tile or not (with the primitive being culled if it is determined not to be inside the tile). If the primitive passes the first edge test, then the second edge equation would be calculated and again used to test if the primitive is inside the tile being processed or not. If the primitive then passes the second edge test, the third edge equation for the primitive could be calculated and again used to test if the primitive is inside the tile being processed or not (and so on if the primitive has more edges).

If the primitive passes the third edge test (all the edge tests), then the depth equation for the primitive could be determined and the primitive subjected to the early depth and stencil tests (and culled if it fails those tests), with the primitive then being rasterised to fragments if it passes the depth and stencil tests (if it is not culled by the depth and stencil tests). Each fragment would then be rendered (shaded), with the barycentric equations for the primitive being determined, e.g. once the first fragment from the primitive in question executes a varying instruction.

In general the calculation and testing and use of the various primitive set-up information can be split up as desired. For example, one could perform rasterisation and if the primitive passes the rasterisation process, then calculate and perform z and stencil tests, and if the primitive fails the depth and stencil tests, then not calculate the barycentric equations. Additionally, depending upon where in the process the barycentric equation calculation is performed, it could be the case that even if fragments for a primitive pass the early depth and stencil tests, the calculation of the barycentric equations can be avoided, for example if the fragments are "killed" due to shader discards before the barycentric calculations are performed.

Figure 3:
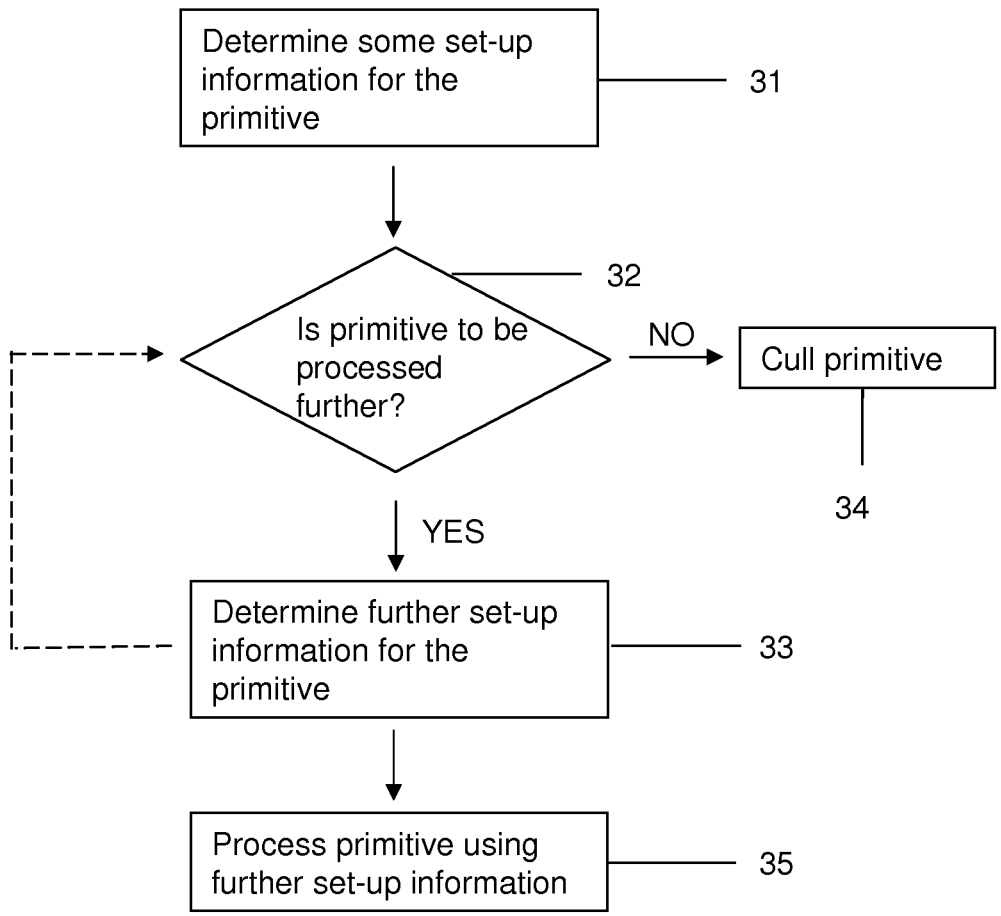
FIG. 3 illustrates the method performed by the processing pipeline in the described embodiment of the technology described herein.

FIG. 3 illustrates the method of the embodiments of the technology described herein.

A primitive to be rendered is processed at step 31 to determine set-up information for the primitive. As discussed above, this set-up information comprises any or all of the following information: one or more or all of the edge equations for the primitive and a depth equation and/or one or more stencil reference values for the primitive.

At step 32 at least part of this information is then tested to determine if the primitive is to be processed further (e.g. whether or not the primitive (or at least a part thereof) is located and/or visible in the tile being processed). In some embodiments, step 32 includes testing all of the information determined at step 31 to determine if the primitive is to be processed further. In some embodiments, step 32 involves performing a stencil test.

If step 32 determines that the primitive is not to be processed further, the primitive is culled from further processing (step 34) and the whole process starts again for the next primitive to be processed (if any).

On the other hand, if step 32 does not determine that the primitive is not to be processed further, further set-up information for the primitive is determined (step 33). This could be any or all of the following information: one or more or all of the edge equations for the primitive and a depth equation and/or one or more stencil reference values for the primitive (if not already determined at step 31), or, in cases where all of that information has already been determined, step 33 comprises determining barycentric equations for the primitive.

In cases where step 33 comprises determining one or more or all of the edge equations for the primitive and a depth equation and/or one or more stencil reference values for the primitive, this information is then, in some embodiments, tested at step 32 to determine whether the primitive is to be processed further and, if appropriate, to cull the primitive from further processing (step 34).

In cases where step 33 comprises determining the barycentric equations for the primitive, the primitive is then passed on to step 35 for further processing (e.g. rendering).

As will be appreciated by those skilled in the art, alternatives and modifications to the above described embodiments of the technology described herein would be possible, if desired. For example, although the above embodiments have been described in the context of a tile-based graphics processing system, the technology described herein can equally apply to immediate mode (i.e. not tile-based) graphics processing systems.

Similarly, although the rasteriser in the above embodiments operates in a hierarchical fashion to iteratively test a primitive against progressively smaller patches of the render output, the technology described herein could equally be implemented in graphics processing pipelines that use more conventional rasterisation arrangements.

Similarly, although the first primitive set-up stage 11 and second primitive set-up stage 12 have been shown in FIG. 1 as distinct stages of the graphics processing pipeline, it will be appreciated that those stages could, if desired, be implemented as part of or incorporated within other stages of the graphics processing pipeline. For example, the first primitive set-up stage 11 could be implemented within (as part of) the rasteriser 10, and the second primitive set-up stage 12 could be implemented within (as part of) the shader pipeline 6. Other arrangements would, of course, be possible.

It can be seen from the above, that the technology described herein, in some embodiments at least, can provide improved techniques for rendering primitives in a graphics processing system, and it can, for example, avoid unnecessarily deriving and processing primitive information that will not in fact be required. This is achieved, in some embodiments of the technology described herein at least, by initially determining some of, but not all, of the set-up information that is required for a primitive, and then only deriving further set-up information for the primitive if the primitive passes one or more tests to determine if the primitive is to be processed further.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that includes a rasteriser that rasterises input primitives to generate graphics fragments to be processed, each graphics fragment having one or more sampling points associated with it, and a renderer that processes fragments generated by the rasteriser to generate output fragment data for output to a render output, the method comprising:
when processing a graphics primitive to generate a render output:
(i) determining first primitive set-up information to be used to test whether at least a part of the primitive should be processed further;
(ii) using at least some of the first primitive set-up information to decide whether to process at least a part of the primitive further; and
if it is decided that at least a part of the primitive is to be processed further:
(iii) determining second primitive set-up information to be used to test whether at least a part of the primitive should be processed further; and (iv) using at least some of the second primitive set-up information to decide whether to process at least a part of the primitive further;
wherein the second primitive set-up information comprises at least one edge equation for the primitive and step (iv) comprises determining if the primitive is located at least partially within a region of the render output, using the second primitive set-up information.

2. A method as claimed in claim 1, wherein the first primitive set-up information comprises information to be used to determine if the primitive is located at least partially within a region of the render output.

3. A method as claimed in claim 2, wherein step (ii) comprises testing the first primitive set-up information to be used to determine if the primitive is located at least partially within a region of the render output to determine if the primitive is located at least partially within a region of the render output and, if it is determined that the primitive is not located at least partially within a region of the render output, not processing the primitive further.

4. A method as claimed in claim 2, wherein the first information comprises information specifying the location of at least one edge of the primitive.

5. A method as claimed in claim 1, wherein the first primitive set-up information comprises information to be used in a depth and/or stencil test for at least a part of the primitive.

6. A method as claimed in claim 5, wherein step (ii) comprises performing a depth and/or stencil test and, if the primitive does not pass the depth and/or stencil test, not processing the primitive further.

7. A method as claimed in claim 1, wherein the method further comprises, if it is decided at step (iv) that at least a part of the primitive is to be processed further:
(v) determining further information to be used in further processing of the primitive; and
(vi) further processing at least a part of the primitive using the determined further information.

8. A method as claimed in claim 7, wherein step (v) includes determining information to be used for rendering the primitive.

9. A method as claimed in claim 8, wherein the information to be used for rendering the primitive comprises one or more barycentric equations for the primitive.

10. A method as claimed in claim 7, wherein step (vi) comprises rendering at least a part of the primitive.

11. A method as claimed in claim 1, wherein:
the second primitive set-up information further comprises at least one depth equation or at least one stencil reference value for the primitive, and step (iv) further comprises performing a depth or stencil test for at least a part of the primitive, using the second primitive set-up information.

12. A graphics processing pipeline for rendering input primitives to generate a render output, the pipeline comprising:
a rasteriser that rasterises input primitives to generate graphics fragments to be processed, each graphics fragment having one or more sampling points associated with it, and a renderer that processes fragments generated by the rasteriser to generate output fragment data for output to a render output;
first primitive set-up stage circuitry configured to determine first primitive set-up information to be used to test whether at least a part of a primitive being processed by the pipeline should be processed further;
first primitive test stage circuitry configured to use at least some of the determined first primitive set-up information to decide whether to process at least a part of the primitive further;
second primitive set-up stage circuitry configured to, if it is decided that at least a part of the primitive is to be processed further after the first primitive test:
determine second primitive set-up information to be used to test whether at least a part of the primitive being processed by the pipeline should be processed further; and
second primitive test stage circuitry configured to use at least some of the second primitive set-up information to decide whether to process at least a part of the primitive further;
wherein the second primitive set-up information comprises at least one edge equation for the primitive and the second primitive test stage circuitry is configured to determine if the primitive is located at least partially within a region of the render output, using the second primitive set-up information.

13. A pipeline as claimed in claim 12, wherein the first primitive set-up information comprises information to be used to determine if the primitive is located at least partially within a region of the render output.

14. A pipeline as claimed in claim 13, wherein the first primitive test stage circuitry is configured to test the first primitive set-up information to be used to determine if the primitive is located at least partially within a region of the render output to determine if the primitive is located at least partially within a region of the render output and, if it is determined that the primitive is not located at least partially within a region of the render output, to cull the primitive from further processing.

15. A pipeline as claimed in claim 13, wherein the first primitive set-up information comprises information specifying the location of at least one edge of the primitive.

16. A pipeline as claimed in claim 12, wherein the first primitive set-up information comprises information to be used in a depth and/or stencil test for at least a part of the primitive.

17. A pipeline as claimed in claim 16, wherein the first primitive test stage circuitry is configured to perform a depth and/or stencil test and to, if at least a part of the primitive does not pass the depth and/or stencil test, cull the at least a part of the primitive from further processing.

18. A pipeline as claimed in claim 12, further comprising circuitry configured to, if the second primitive test stage circuitry decides that at least a part of the primitive is to be processed further:
determine further information to be used in further processing of the primitive; and
process at least a part of the primitive further using the determined further information.

19. A pipeline as claimed in claim 18, wherein the further information comprises information to be used for rendering a primitive.

20. A pipeline as claimed in claim 19, wherein the further information to be used for rendering a primitive comprises one or more barycentric equations for the primitive.

21. A pipeline as claimed in claim 12, wherein:
the second primitive set-up information further comprises at least one depth equation or at least one stencil reference value for the primitive and the second primitive test stage circuitry is further configured to perform a depth or stencil test for at least a part of the primitive, using the second primitive set-up information.

22. A pipeline as claimed in claim 12, wherein the pipeline is configured to, if at least a part of the primitive passes the second primitive test, pass the at least a part of the primitive to the renderer.

23. A non-transitory computer readable storage medium storing computer software code which, when executed on a processor, performs a method of operating a graphics processing pipeline that includes a rasteriser that rasterises input primitives to generate graphics fragments to be processed, each graphics fragment having one or more sampling points associated with it, and a renderer that processes fragments generated by the rasteriser to generate output fragment data for output to a render output, the method comprising:
   when processing a graphics primitive to generate a render output:
   (i) determining first primitive set-up information to be used to test whether at least a part of the primitive should be processed further;
   (ii) using at least some of the first primitive set-up information to decide whether to process at least a part of the primitive further; and
   if it is decided that at least a part of the primitive is to be processed further:
   (iii) determining second primitive set-up information to be used to test whether at least a part of the primitive should be processed further; and
   (iv) using at least some of the second primitive set-up information to decide whether to process at least a part of the primitive further;
   wherein the second primitive set-up information comprises at least one edge equation for the primitive and step (iv) comprises determining if the primitive is located at least partially within a region of the render output, using the second primitive set-up information.

* * * * *

UNITED STATES PATENT AND TRADEMARK OFFICE
CERTIFICATE OF CORRECTION

PATENT NO. : 9,536,333 B2
APPLICATION NO. : 14/056727
DATED : January 3, 2017
INVENTOR(S) : Heggelund et al.

It is certified that error appears in the above-identified patent and that said Letters Patent is hereby corrected as shown below:

On the Title Page

Item (72) "Inventors", please change "Henrik Ohlsson" to -- Henrik Olsson --.

Signed and Sealed this
Thirtieth Day of May, 2023

Katherine Kelly Vidal
*Director of the United States Patent and Trademark Office*